United States Patent [19]

Davis

[11] 4,073,083
[45] Feb. 14, 1978

[54] FISHING WORM THREADER

[76] Inventor: Chester B. Davis, 3921 Continental Way, Carmichael, Calif. 95608

[21] Appl. No.: 707,344

[22] Filed: July 21, 1976

[51] Int. Cl.² .................................. A01K 97/00
[52] U.S. Cl. ............................................. 43/4
[58] Field of Search ................................... 43/4

[56] References Cited

U.S. PATENT DOCUMENTS

| 1,092,529 | 4/1914 | Horn | 43/4 X |
| 2,948,979 | 8/1960 | Kulp | 43/4 |
| 3,925,919 | 12/1975 | Huth | 43/4 |

*Primary Examiner*—Russell R. Kinsey
*Assistant Examiner*—Daniel J. Leach
*Attorney, Agent, or Firm*—Blair & Brown

[57] ABSTRACT

A fishing worm threader which includes a handle having a threading needle projecting therefrom with the threading needle having in its sharpened tip end a pocket to receive the point of a fish hook. The needle is threaded through a worm either alive or artificial and the point of a fish hook is placed in the socket of the needle so that the worm can be moved from the needle onto the fish hook so as to be threaded onto the hook.

1 Claim, 3 Drawing Figures

FISHING WORM THREADER

BACKGROUND OF THE INVENTION

1. FIELD OF THE INVENTION

The present invention relates to fish hook threaders.

2. SUMMARY OF THE INVENTION

A fish hook threader of the present invention includes an enlongate needle secured in one end of a handle with the free end of the needle being sharpened and having a socket therein to receive the point of a fish hook. In using the invention the needle is threaded through an artificial or live worm and the fish hook point is seated in the socket in the end of the needle to permit the worm to be slid along the needle and threaded onto the fish hook.

The primary object of the invention is to provide a bait threader for fish hooks which is easy to use, which prevents injuries from engaging the fish hook and which is inexpensive to manufacture.

Other objects and advantages will become apparent in the following specification, when considered in light of the attached drawings.

DESCRIPTION OF THE PREFERRED EMBODIMENT

Figure 1:
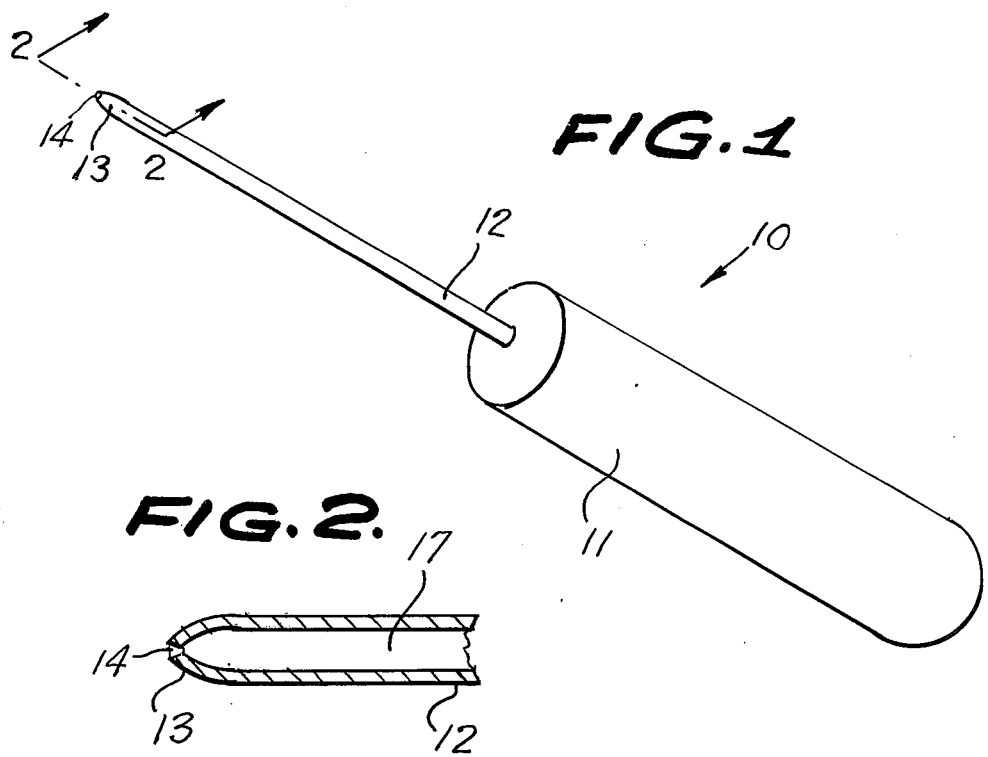
FIG. 1 is a perspective view of the invention.
Figure 2:
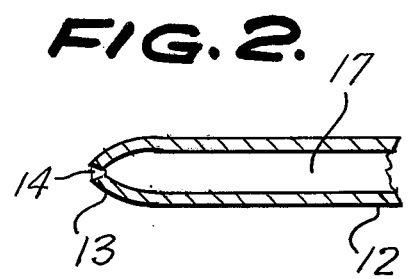
FIG. 2 is an enlarged fragmentary sectional view taken along the line 2—2 of FIG. 1 looking in the direction of the arrows.

Referring now to the drawings in detail, wherein like reference characters indicate like parts throughout the several figures, the reference numeral 10 indicates generally a fish hook bait threader constructed in accordance with the invention.

Figure 3:
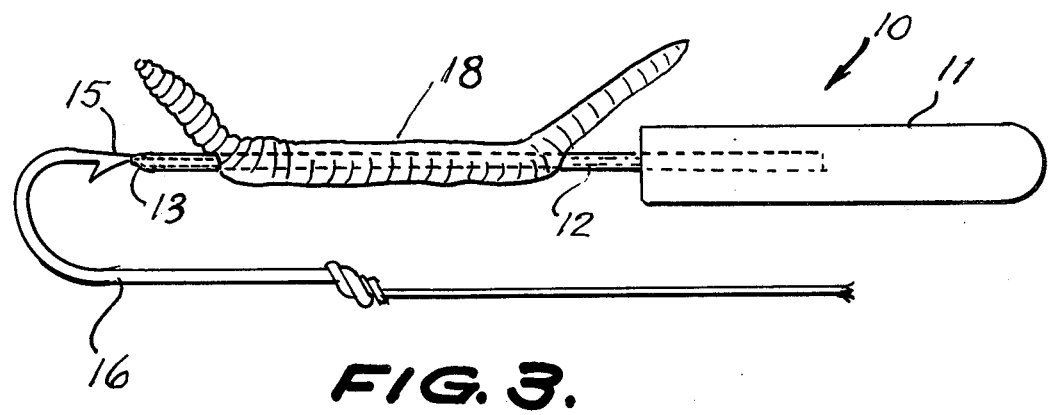
FIG. 3 is a side elevation of the invention with a worm threaded onto the needle and preparatory to moving the worm onto a fish hook.

The fish hook bait threader 10 includes a generally cylindrical handle 11 having a needle 12 extending axially from one end thereof. The needle 12 is sharpened at 13 on its outer end portion and has a socket 14 formed in its outer terminal end to receive the point 15 of a fish hook 16 as illustrated in FIG. 3.

The needle 12 may be hollow as at 17 or solid as desired.

In the use and operation of the invention the worm 18 which may either live or artificial is pierced by the needle 12 and the needle 12 is threaded through the worm with the part 13 of the needle 12 extending outwardly beyond the worm 18. The part 15 of the fish hook 16 is then engaged in the socket 14 of the needle 12 and the worm 18 is slid off of the needle 12 and onto the fish hook 16 to thus bait the hook 16 making it ready for fishing. It should be noted that other bait materials may also be threaded onto the needle 12 for placement on the fish hook 16.

Having thus described the preferred embodiment of the invention it should be understood that numerous structural modifications and adaptations may be resorted to without departing from the spirit of the invention.

What is claimed is:

1. A fish hook bait threader comprising a generally cylindrical handle, an elongate hollow needle having one end secured to said handle and the opposite end extending axially outwardly therefrom, and a socket formed in the outer end of said needle to receive the part of a fish hook to permit bait threaded on said needle to be transferred to the fish hook.

* * * * *